(12) United States Patent
Chintalapoodi et al.

(10) Patent No.: US 10,529,379 B2
(45) Date of Patent: Jan. 7, 2020

(54) SYSTEM AND METHOD FOR PROCESSING VIDEO CONTENT BASED ON EMOTIONAL STATE DETECTION

(71) Applicant: SONY CORPORATION, Tokyo (JP)

(72) Inventors: Pramod Chintalapoodi, San Diego, CA (US); Nabarun Goswami, Bangalore (IN); Hemant Sadhwani, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/260,637

(22) Filed: Sep. 9, 2016

(65) Prior Publication Data

US 2018/0075876 A1    Mar. 15, 2018

(51) Int. Cl.
*G11B 27/034*      (2006.01)
*G06K 9/00*        (2006.01)
*G11B 27/36*       (2006.01)
*G11B 31/00*       (2006.01)
*H04H 60/33*       (2008.01)
*H04H 60/61*       (2008.01)

(52) U.S. Cl.
CPC ........ *G11B 27/034* (2013.01); *G06K 9/00315* (2013.01); *G06K 9/00335* (2013.01); *G11B 27/36* (2013.01); *G11B 31/006* (2013.01); *H04H 60/33* (2013.01); *H04H 60/61* (2013.01)

(58) Field of Classification Search
CPC ..... G11B 27/034; G11B 27/36; G11B 31/006; G06K 9/00335; G06K 9/00315
USPC ....................................................... 386/239
See application file for complete search history.

(56) References Cited

U.S. PATENT DOCUMENTS

2007/0186241 A1*  8/2007  Sugimoto ............ H04N 5/4403
                                                       725/46
2010/0277763 A1* 11/2010  Aoyama ................. G06F 21/34
                                                       358/1.15
(Continued)

FOREIGN PATENT DOCUMENTS

CN        103609128 A        2/2014
EP           1582965 A1     10/2005
(Continued)

OTHER PUBLICATIONS

Stephen Schenck, "Microsoft's Project Oxford Lets Apps Identify Your Emotions", Nov. 11, 2015, pp. 2 Available At: HTTP://POCKETNOW.COM/2015/11/11/RECOGNIZE-EMOTIONS.
(Continued)

*Primary Examiner* — Loi H Tran
(74) *Attorney, Agent, or Firm* — Chip Law Group

(57) ABSTRACT

Various aspects of a system and a method for processing of a video content based on emotional state detection of one or more users are disclosed herein. The system includes a video-processing device, which detects a change in an emotional state of a first user viewing a first video content on the video-processing device. One or more groups of image frames of the first video content, viewed during the detected change in the emotional state of the first user at one or more time instances, are associated with the changed emotional state. A second video content is generated by use of the associated one or more groups of image frames of the first video content, based on the detected change in the emotional state of the first user.

24 Claims, 5 Drawing Sheets

(56) References Cited

U.S. PATENT DOCUMENTS

| | | |
|---|---|---|
| 2011/0038547 A1 | 2/2011 | Hill |
| 2012/0124456 A1 | 5/2012 | Perez et al. |
| 2012/0324491 A1 | 12/2012 | Bathiche et al. |
| 2013/0159228 A1 | 6/2013 | Meijer et al. |
| 2014/0207811 A1 | 7/2014 | Kim et al. |
| 2015/0067708 A1* | 3/2015 | Jensen ............... H04N 21/4756 725/10 |
| 2015/0089520 A1 | 3/2015 | Lee et al. |
| 2016/0099023 A1* | 4/2016 | Pacurariu ............. G11B 27/034 386/227 |
| 2016/0241533 A1* | 8/2016 | Bist ................... G06F 17/30032 |
| 2017/0339338 A1* | 11/2017 | Gordon ............. H04N 5/23219 |
| 2018/0041552 A1* | 2/2018 | Ormseth ............. H04L 65/1093 |

FOREIGN PATENT DOCUMENTS

| | | |
|---|---|---|
| EP | 2921106 A | 9/2015 |
| JP | 2005-128884 A | 5/2005 |
| JP | 2012-169743 A | 9/2012 |
| JP | 2014-502454 A | 1/2014 |
| JP | 2015-133625 A | 7/2015 |
| KR | 10-2016-0065670 A | 6/2016 |

OTHER PUBLICATIONS

Extended European Search Report of EP Patent Application No. 17189902.4, dated Dec. 7, 2017, 8 pages.

Office Action for KR Patent Application No. 10-2017-0112539, dated Jul. 26, 2018, 06 pages of Office Action and 05 pages of English Translation.

Office Action for EP Patent Application No. 17189902.4, dated Nov. 14, 2018, 06 pages of Office Action.

Office Action for JP Patent Application No. 2017-170948, dated Oct. 11, 2018, 06 pages of Office Action and 06 pages of English Translation.

Office Action for CN Patent Application No. 201710788129.7, dated Oct. 11, 2019, 08 pages of Office Action and 09 pages of English Translation.

* cited by examiner

SYSTEM AND METHOD FOR PROCESSING VIDEO CONTENT BASED ON EMOTIONAL STATE DETECTION

CROSS-REFERENCE TO RELATED APPLICATIONS/INCORPORATION BY REFERENCE

None.

FIELD

Various embodiments of the disclosure relate to a system and method for processing of video content. More specifically, various embodiments of the disclosure relate to system and method for processing of video content based on emotional state detection of a user.

BACKGROUND

Recent advancements in the field of video processing techniques have extended the functionalities of various electronic devices and associated applications. Previously, expensive machines were employed to process video for video editing purposes. However, the cost of video editing and related devices has declined over time due to continuous advancements in the video-processing devices and the video processing techniques. Various tools, applications, machines, and/or devices for video editing of digital video frame sequences are widely used in various industries, such as consumer electronics (CE), media, and/or motion picture production and post-production industry. Currently, manipulation of captured video content may a time-consuming process. Further, a high level of specialization may be required to produce uniform and quality results. Although certain level of automation in video editing techniques have emerged, still post-processing techniques may require huge computational resources, and thus may be impractical for consumer use. Thus, an advanced and efficient technique or system may be required, where a human element may be employed in an intelligent manner for quick and qualitative processing of digital video content.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method are provided to process video content based on emotional state detection of one or more users substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
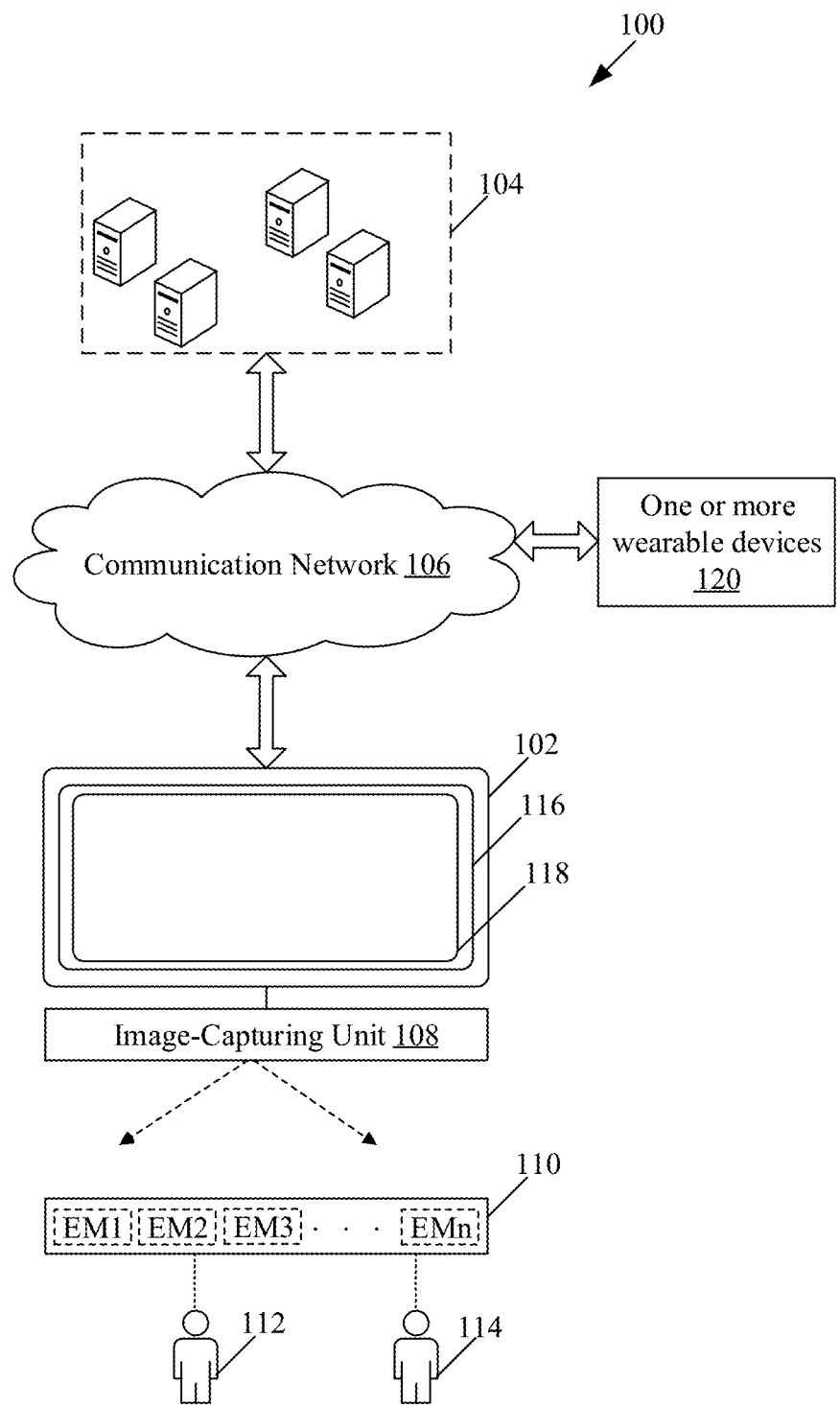
FIG. 1 is a block diagram that illustrates a network environment to process video content based on emotional state detection of one or more users, in accordance with an embodiment of the disclosure.

The following described implementations may be found in the disclosed system and method to process video based on emotional state detection. Exemplary aspects of the disclosure may include a video-processing device, which may detect a change in an emotional state of a first user viewing a first video content on the video-processing device. One or more groups of image frames of the first video content, viewed during the detected change in the emotional state of the first user at one or more time instances, may be associated with the changed emotional state. A second video content may be generated by use of the associated one or more groups of image frames of the first video content. The generation of the second video content may be based on the detected change in the emotional state of the first user.

In accordance with an embodiment, the emotional state may correspond to a neutral, happy, sad, anger, contempt, fear, surprise, confused, and/or tender emotion. A level associated with the changed emotional state of the first user may be determined during viewing of the first video content on the video-processing device for the association. A plurality of emotional states of the first user may be monitored while the first user may be viewing the first video content. The monitoring may be based on one or more images or a video of the first user captured by use of an image-capturing device communicatively coupled to the video-processing device and/or sensor data received from one or more wearable devices associated with the first user.

In accordance with an embodiment, the one or more groups of image frames of the first video content associated with the changed emotional state may be selected for the generation of the second video content. A plurality of video content items may be simultaneously generated from the first video content based on a detection of a plurality of different emotional states of the first user.

In accordance with an embodiment, a change in an emotional state of a second user may be detected, while the second user is viewing the first video content on the video-processing device. One or more other groups of image frames of the first video content may be associated with the changed emotional state of the second user. The association may occur while the first video content is viewed during the detected change in the emotional state of the second user at one or more other time instances.

In accordance with an embodiment, the second video content and a third video content may be simultaneously generated based on the detected change in the emotional state of the first user and the second user. The third video content may be generated by use of the associated one or more other groups of image frames of the first video content.

The first video content may be automatically edited based on the detected change in the emotional state of the first user.

In accordance with an embodiment, the generated second video content may correspond to emotional video highlights automatically generated from the first video content based on the detected change in the emotional state of the first user. One or more groups of image frames selected from each of a plurality of video content items viewed on the video-processing device may be combined to generate a single video content based on the detected change in the emotional state of the first user.

FIG. 1 is a block diagram that illustrates a network environment to process video based on emotional state detection, in accordance with an embodiment of the disclosure. With reference to FIG. 1, there is shown an exemplary network environment 100. The network environment 100 may include a video-processing device 102, a server 104, a communication network 106, an image-capturing unit 108, a plurality of emotional states 110, and one or more users, such as a first user 112, and a second user 114. The video-processing device 102 may include a display screen 116 and an application interface 118 rendered on the display screen 116. There is also shown one or more wearable devices 120. The plurality of emotional states 110 may be associated with the first user 112 and/or the second user 114. The video-processing device 102 may be communicatively coupled to the server 104, and/or the one or more wearable devices 120, via the communication network 106. The one or more users, such as the first user 112 and the second user 114, may be associated with the video-processing device 102.

The video-processing device 102 may comprise suitable logic, circuitry, interfaces, and/or code that may be configured to receive one or more video content items to be processed from the server 104, via the communication network 106. In accordance with an embodiment, one or more videos may be transferred to the video-processing device 102 for processing from external devices, such as external storage medium, or another electronic device via wired or wireless communication medium. Examples of the video-processing device 102 may include, but are not limited to, a computing device, a video editor machine, a smartphone, a laptop, a smart television (TV), a motion-capture system, a camera, an action cam, a camcorder, a tablet computer, a projector, and/or other video-processing device.

The server 104 may comprise suitable logic, circuitry, interfaces, and/or code that may be configured to store a plurality of captured videos. The server 104 may be communicatively coupled with a remote electronic device, such as the video-processing device 102. The server 104 may be cloud based server, a web server, a database server, a file server, an application server, or a combination thereof. The server 104 may be implemented by use of several technologies that are well known to those skilled in the art.

The communication network 106 may include a medium through which the video-processing device 102 may communicate with the server 104. The communication network 106 may be a wired or wireless communication network. Examples of the communication network 106 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the Internet. Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hyper-text Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols, Internet of Things (IOT) communication protocol, or Bluetooth (BT) communication protocols.

The image-capturing unit 108 may comprise suitable logic, circuitry, interfaces, and/or code that may be configured to capture one or more images or video of the one or more users. In accordance with an embodiment, the image-capturing unit 108 may refer to an in-built camera or an image sensor of the video-processing device 102. Alternatively, the image-capturing unit 108 may be an external camera connected to the video-processing device 102.

The plurality of emotional states 110 refers to emotional states of the one or more users detected by the video-processing device 102. The plurality of emotional states 110, such as "EM1, EM2, EM3, . . . , EMn", may include neutral, happy, sad, anger, contempt, fear, surprise, confused, and/or tender emotions. The plurality of emotional states 110 may be detected based on the one or more images or video of the one or more users captured by the image-capturing unit 108. In accordance with an embodiment, each of the one or more users may be associated with a wearable device of the one or more wearable devices 120, which may be communicatively coupled with the video-processing device 102. The sensor data received from the wearable device may be further utilized to monitor a change in emotional state of the one or more users.

The display screen 116 may comprise suitable logic, circuitry, interfaces, and/or code that may be configured to render the application interface 118 to enable editing of the captured videos. In accordance with an embodiment, the display screen 116 may be implemented as a part of the video-processing device 102. The display screen 116 may be realized through several known technologies, such as Liquid Crystal Display (LCD), Light Emitting Diode (LED) based display, Organic LED display technology, Retina display technology, and/or the like.

The application interface 118 may be rendered on the display screen 116 of the video-processing device 102. The application interface 118 may facilitate the video editing process in the video-processing device 102. The application interface 118 may be pre-stored at the video-processing device 102. The application interface 118 may be configured to render ingested video content and corresponding video frames for processing in the video-processing device 102.

The one or more wearable devices 120 may be refer to wearable electronics and/or electronic implants. The one or more wearable devices 120 may comprise suitable logic, circuitry, interfaces, and/or code that may be configured to communicate sensor data to a connected device, such as the video-processing device 102 or the server 104. The one or more wearable devices 120 may be worn by a user, such as the first user 112 and the second user 114. For example, a smart glass, a smart band, or a smart watch worn by the user, may be used to measure calorie intake, calories burned, sleep patterns, and/or physiological parameters, such as perspiration or heart rate, or physical activity of the user. Examples of the one or more wearable devices 120 may include, but are not limited to, a wearable cardiac-event recorder, a biocompatible sensor (that may be attached, worn, or implanted into a human body to predict ovulation cycle, monitor physiological parameters, such as heart rate, pulse oximetry, respiratory rate, and/or blood pressure), an implantable radio frequency device, such as the, "Obamacare microchip RFID implant", and/or other such wearable or implantable device that may provide sensor data related to monitoring of physiological parameters of the user, such as the first user 112 or the second user 114, for tracking of emotional states of the user. In accordance with an embodiment, the one or more wearable devices 120 may not be used and the emotional states may be detected by use of a video of the user as captured by the image-capturing unit 108.

In operation, the video-processing device 102 may be configured to receive one or more video content. The one or more video content may be received from the server 104, via the communication network 106. In accordance with an embodiment, the one or more video content may be received from an external device, such as an external storage device, via wired or wireless communication medium. The video-processing device 102 may be configured to render at least a first video content of the received one or more video content, via the application interface 118. In accordance with an embodiment, the first video may be rendered based on an input received from a user, such as the first user 112. Alternatively, the video-processing device 102 may comprise one or more pre-configured settings to process the one or more video content, in user-defined order.

In accordance with an embodiment, the one or more users, such as the first user 112, may be viewing the first video content on the display screen 116 of the video-processing device 102. The video-processing device 102 may capture one or more images or a video of the first user 112 that may be viewing the first video content on the video-processing device 102, by use of the image-capturing unit 108. The video-processing device 102 may be configured to continuously monitor emotions of the first user 112 while the first user 112 is viewing the first video content. The emotions may be monitored based on an analysis of the captured one or more images or the video of the first user 112.

In accordance with an embodiment, the video-processing device 102 may be configured to detect a change in an emotional state of the first user 112 viewing the first video content on the video-processing device 102. The change in the emotional state may correspond to a transition from a first emotional state, such as neutral, to a second emotional state, such as happy, of the plurality of the emotional states 110 of the first user 112.

In accordance with an embodiment, the video-processing device 102 may be configured to determine a level associated with the changed emotional state of the first user 112 during the viewing of the first video content on the video-processing device 102. The determined level may correspond to an extent of an emotional state. For example, an extent of happiness, such as moderately happy or excited emotional state may be detected when the first user 112 is viewing of the first video content.

In accordance with an embodiment, the video-processing device 102 may be configured to associate one or more groups of image frames of the first video content with the changed emotional state, such as an excited emotional state. The association may occur during the detected change in the emotional state of the first user 112 at one or more time instances when the first video content is viewed on the video-processing device 102.

In accordance with an embodiment, the video-processing device 102 may be configured to select the one or more groups of image frames of the first video content associated with the changed emotional state. The video-processing device 102 may be configured to generate a second video content by use of the selected one or more groups of the image frames associated with the changed emotional state. The generated second video content may correspond to emotional highlights, such as the excited emotional highlights, dynamically generated from the first video content based on the detected changed emotional state of the first user 112.

In accordance with an embodiment, the first user 112 and the second user 114 may be simultaneously viewing the first video content on the video-processing device 102. In such an embodiment, the video-processing device 102 may be configured to simultaneously monitor emotions of the first user 112 and the second user 114. In addition to the first user 112, the video-processing device 102 may further associate one or more other groups of image frames of the first video content, viewed during the detected change in the emotional state of the second user 114 with the changed emotional state of the second user 114. The video-processing device 102 may be configured to simultaneously generate the second video content and another video based on the detected changed emotional state of the first user 112 along with the second user 114.

In accordance with an embodiment, the video-processing device 102 may be configured to generate emotional highlights related to each of the plurality of emotional states 110 for all the content items viewed during a day, a month, or a year. In accordance with an embodiment, the first user 112 may view various media content in a plurality of the video-processing devices. The plurality of the video-processing devices may be similar to the video-processing device 102. In such an embodiment, the generated emotional highlights in the plurality of the video-processing devices may be communicated to the server 104 for central storage. The server 104 may then generate emotional highlights, sad emotional highlights, happy emotional highlights or anger emotional highlights, which may include segments of the media content viewed on the plurality of the video-processing devices. The segments may correspond to the one or more groups of image frames associated with one or more of the plurality of emotional states 110.

Figure 2:
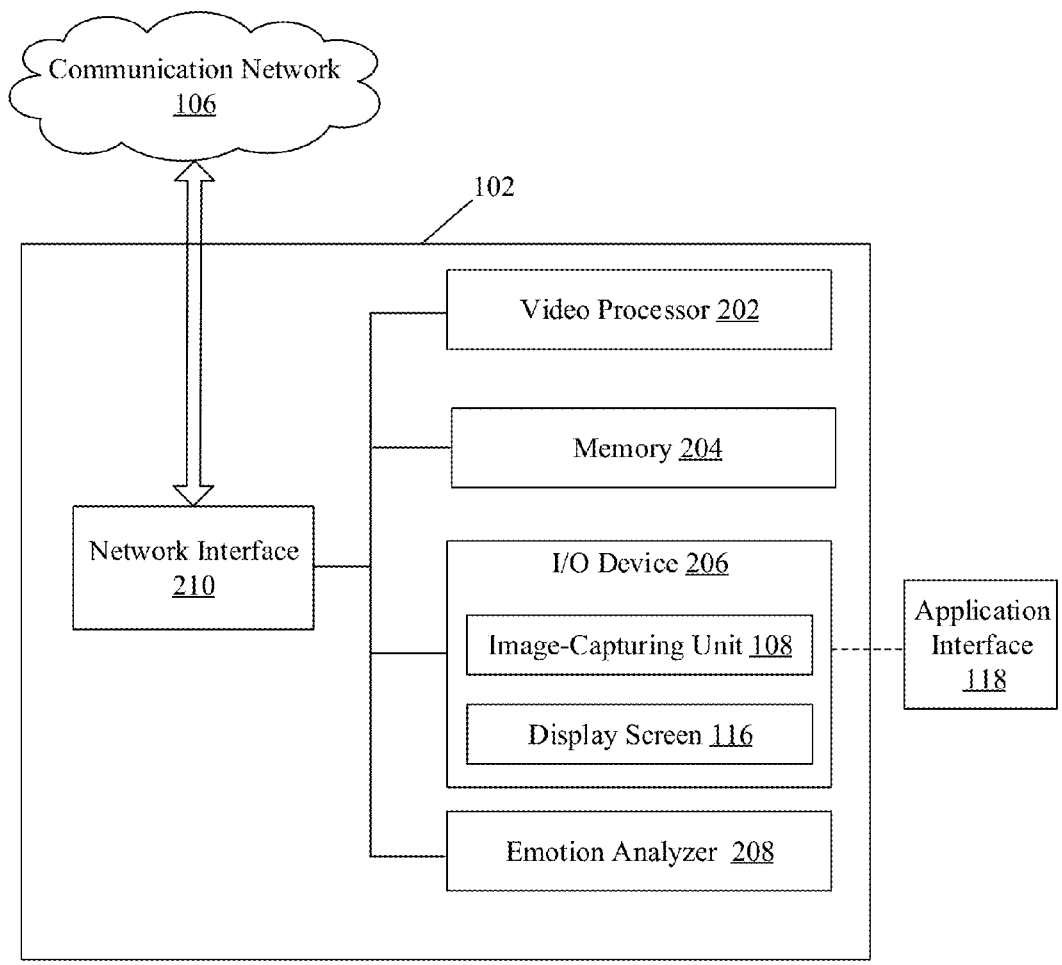
FIG. 2 illustrates a block diagram of an exemplary video-processing device to process video content based on emotional state detection of one or more users, in accordance with an embodiment of the disclosure.

FIG. 2 illustrates a block diagram of an exemplary video-processing device to process video based on emotional state detection, in accordance with an embodiment of the disclosure. FIG. 2 is explained in conjunction with elements from FIG. 1. With reference to FIG. 2, there is shown the video-processing device 102. The video-processing device 102 may comprise one or more processors, such as a video processor 202, a memory 204, one or more input/output (I/O) devices, such as an I/O device 206, an emotion analyzer 208, and a network interface 210. There is further shown the image-capturing unit 108, the display screen 116, and the application interface 118 in the I/O device 206.

The video processor 202 may be communicatively coupled to the memory 204, the I/O device 206, the emotion analyzer 208, and the network interface 210. The network interface 210 may communicate with the server 104, via the communication network 106, under the control of the video processor 202.

The video processor 202 may comprise suitable logic, circuitry, interfaces, and/or code that may be configured to execute a set of instructions stored in the memory 204. The video processor 202 may be implemented based on a number of processor technologies known in the art. Examples of the video processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or control circuits.

The memory 204 may comprise suitable logic, circuitry, and/or interfaces that may be configured to store a machine code and/or a set of instructions executable by the video processor 202. The memory 204 may be further configured to store one or more captured videos to be processed and the processed or edited videos. The memory 204 may be further configured to store the application interface 118 and one or more configurable settings preset by the one or more users. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the one or more users, such as the first user 112. The I/O device 206 may be further configured to provide an output to the one or more users. The I/O device 206 may comprise various input and output devices that may be operable to communicate with the video processor 202. Examples of the input devices may include, but are not limited to, the image-capturing unit 108, a touch screen, a keyboard, an infrared sensor, a mouse, a joystick, a microphone, a motion sensor, a light sensor, one or more sensors, such as a geospatial location detection sensor, and/or a docking station. Examples of the output devices may include, but are not limited to, the display screen 116, a projector screen, and/or a speaker.

The emotion analyzer 208 may comprise suitable logic, circuitry, and/or interfaces that may be configured to analyze the one or more images or video captured by the image-capturing unit 108. The emotion analyzer 208 may be further configured to analyze the sensor data received from the one or more wearable devices 120 associated with the one or more users, such as the first user 112 and the second user 114. The emotion analyzer 208 may be configured to continuously detect changes in an emotional state of the one or more users based on the analysis of the received one or more images or video and/or the sensor data. In accordance with an embodiment, the emotion analyzer 208 may be a part of the video processor 202. Alternatively, the emotion analyzer 208 may be implemented as a separate processor or circuitry in the video-processing device 102. In accordance with an embodiment, the emotion analyzer 208 and the video processor 202 may be implemented as an integrated processor or a cluster of processors that perform the functions of the emotion analyzer 208 and the video processor 202. In accordance with an embodiment, the emotion analyzer 208 may be implemented as a set of instructions stored in the memory 204, which on execution by the video processor 202 may perform the functions of the video-processing device 102.

The network interface 210 may comprise suitable logic, circuitry, interfaces, and/or code that may be configured to communicate with the server 104, via the communication network 106 (as shown in FIG. 1). The network interface 210 may implement known technologies to support wired or wireless communication of the video-processing device 102 with the communication network 106. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wired or wireless communication with the communication network 106. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Long-Term Evolution (LTE), Wireless Fidelity (Wi-Fi) (such as IEEE 802.11a, IEEE 802.11b, IEEE 802.11g and/or IEEE 802.11n), Light-Fidelity (Li-Fi), voice over Internet Protocol (VoIP), Wi-MAX, a protocol for email, instant messaging, and/or Short Message Service (SMS).

In operation, the video processor 202 may be configured to receive one or more video content, by use of the network interface 210. The one or more video content may be received from the server 104, via the communication network 106. In accordance with an embodiment, the one or more video content may be received from an external device, such as an external storage device, via wired or wireless communication medium. The video processor 202 may be configured to render at least a first video content of the received one or more video content, via the application interface 118.

In accordance with an embodiment, the one or more users, such as the first user 112, may be viewing the first video content on the display screen 116 of the video-processing device 102. The video processor 202 may capture one or more images or a video of the first user 112 that may be viewing the first video content on the video-processing device 102, by use of the image-capturing unit 108. The emotion analyzer 208 may be configured to continuously monitor emotions of the first user 112 while the first user 112 is viewing the first video content. The emotions may be monitored based on an analysis of the captured one or more images or the video of the first user 112.

In accordance with an embodiment, the emotion analyzer 208 may be configured to detect a change in an emotional state of the first user 112 viewing the first video content on the video-processing device 102. The change in the emotional state may correspond to a transition from a first emotional state, such as neutral, to a second emotional state, such as happy, of the plurality of the emotional states 110 of the first user 112. The change in the emotional state of the first user 112 may be detected based on the monitoring of the emotions of the first user 112.

In accordance with an embodiment, one or more factors that includes a change in a facial expression, a movement of hands or face, a user sitting position, and/or a body posture may indicate an emotional state of the first user 112. Such one or more factors taken either alone or in combination may provide an increased precision in detection of the emotional state of the first user 112. For example, both hands placed on back of the head and the face tilted upwards while viewing the first video may indicate a relaxed emotional state. Whereas, both hands placed on top of the head and the face tilted downwards while viewing the first video may indicate an upset (or very sad) emotional state.

In conventional emotion detection techniques, certain pre-specified facial expressions or biological health parameters may be used to detect a particular emotion of a user out of the pre-specified emotions. However, human emotions and extent of emotional expressions or body language may vary according to geographical locations, such as country-wise or region-wise. Further, age and sex may also influence how users express their emotions. Accordingly, the emotion detection by use of image processing techniques may need to be customized for accurate detection of the plurality of emotional states 110.

In accordance with an embodiment, the emotion analyzer 208 may be configured to utilize geographical location information of the video-processing device 102 to adjust the emotion detection techniques to be used to detect a particular emotion for a user, such as the first user 112. For instance, a different facial expression scheme or settings may be applied for emotion detection based on the current geographical location information of the video-processing device 102. Such facial expression scheme or settings may be suited to detect emotional expressions or body language in accordance to pre-mapped facial features specific to the geographical location. In accordance with an embodiment, the emotion analyzer 208 may be configured to customize emotion detection techniques based on an age-group or sex of the first user 112. Alternatively, same settings or emotion detection techniques may be used for various age-groups, geographical locations, or male and female individual. The emotion detection techniques may refer to analysis of the facial expression, the movement of hands or face, the user sitting position, and/or the body posture for detection and/or recognition of an emotional state of a user, such as the first user 112.

In accordance with an embodiment, the emotion analyzer 208 may be configured to determine a level associated with the changed emotional state of the first user 112 during the viewing of the first video content on the video-processing device 102. The determined level may correspond to an extent of an emotional state. For example, an extent of happiness, such as moderately happy or excited emotional state may be detected when the first user 112 is viewing the first video content.

In accordance with an embodiment, the first user 112 may be associated with one or more wearable devices 120. In such an embodiment, the video processor 202 may further receive sensor data from the one or more wearable devices 120 to monitor the emotions, such as the plurality of emotional states 110, of the first user 112. The video processor 202 may be configured to further utilize the sensor data to validate the detected change in the emotional state of the first user 112 based on the image processing techniques. The sensor data may correspond to measurement values of various human physiological parameters, such as blood pressure, perspiration, heart rate, body temperature, and the like. For instance, a sad or anxiety emotional state detected based on the analysis of the one or more factors by use of the image processing techniques coupled with a high perspiration rate may confirm a high anxiety level. In accordance with an embodiment, the video processor 202 may be configured to detect a current state of user, such as the user playing golf, go carting, cricket, or other sports in the first video content based on the analysis of the one or more factors by use of the image processing techniques. In such a case, the emotion analyzer 208 may be configured to adjust a base level of the various human physiological parameters accordingly to monitor the emotions of the first user 112. In an event the user 112 is excited to a particular scene, the emotions may be calculated at runtime to a new level and accordingly thrilling moments may be exclusively captured and recorded. The video processor 202 may be configured to store certain groups of image frames associated with the thrilled emotional state as a new video instead of recording all the image frames from a camera, such as the image-capturing unit 108.

In accordance with an embodiment, the video processor 202 may be configured to associate one or more groups of image frames of the first video content with the changed emotional state, such as an excited emotional state. The association may occur during the detected change in the emotional state of the first user 112 at one or more time instances when the first video content is viewed on the video-processing device 102. For example, a first group of "150" image frames may be from timestamp "00:01:25" to 00:01:30" ("Hour:Minutes:Seconds" format) of the first video content. A first change in the emotional state of the first user 112 from a neutral emotional state to an excited emotional state may be detected at time instance "00:01:28" during playback of the first video content. Two seconds prior to and post the detected change in the emotional state of the first user 112 may be associated with the changed emotional state, such as the excited emotional state. Similarly, a second group of "150" image frames may be from timestamp "00:02:30" to 00:02:35" of the first video content. A second change in the emotional state of the first user 112 from the neutral emotional state to the excited emotional state may be detected at time instance "00:02:33" during playback of the first video content. Two seconds prior to- and post (total 5 seconds) the detected change in the emotional state of the first user 112 may be associated with the excited emotional state. Accordingly, other groups of the image frames may be associated with the excited emotional state during playback of the first video content.

In accordance with an embodiment, the video processor 202 may be configured to select the one or more groups of image frames of the first video content associated with the changed emotional state. For example, the first group of "150" image frames, the second group of "150" image frames, and the other groups of the image frames associated with the excited emotional state of the first user 112, may be selected. The video processor 202 may be configured to filter the image frames of the first video content that may not be associated with at least one of the plurality of emotional states 110. The image frames associated with the neutral emotional state may also be filtered out.

In accordance with an embodiment, the video processor 202 may be configured to join the selected one or more groups of the image frames associated with the changed emotional state in accordance with playback time of the selected one or more groups of the image frames. In accordance with an embodiment, the video processor 202 may be configured to generate a second video content that may include the selected one or more groups of the image frames associated with the changed emotional state as a result of the joining operation. Thus, an automatic editing of the first video content may be performed based on the detected change in the emotional state of the first user 112. The generated second video content may correspond to emotional highlights, such as the excited emotional highlights, dynamically generated from the first video content based on the detected changed emotional state of the first user 112.

In accordance with an embodiment, the emotion analyzer 208 may be configured to detect different changes (or transitions) in the emotional states of the first user 112 from the neutral to other peak emotions, such as sad, anger, contempt, fear, surprise, confused, tender, during playback of the first video content on the video-processing device 102. For example, a third and a fourth change in the emotional state of the first user 112 from a neutral emotional state to a sad emotional state may be detected at time instance "00:03:20" and "00:20:10" during playback of the first video content. Accordingly, a third group of image frames and a fourth group of image frames of the first video content viewed during the detection of the sad emotional state may be associated with the sad emotional state. The video processor 202 may then generate a third video content by use of the third group of image frames and the fourth group of image frames associated with the sad emotional state. In accordance with an embodiment, the second video content and the third video content may be simultaneously generated from the first video content. In accordance with an embodiment, the emotion analyzer 208 may be configured to detect different changes (or transitions) in the emotional states of the first user 112 from one peak emotion to another peak emotion, such as happy to sad to again happy, during playback of the first video content on the video-processing device 102. For example, the video-processing device 102 may be a TV. The first user 112 may be viewing a cricket game on the TV. In the event the batsman hits a ball high in the air, the first user 112 may assume it to be a "six", but soon view that the ball is caught by a fielder. In such a scenario, the emotion analyzer 208 may be configured to quickly detect different changes (or transitions) in the emotional states of the first user 112 from one peak emotion to another peak emotion, such as sad to happy (at the time when the six is assumed) to sad (at the time when the ball is caught) for a single scene of the first video content.

In accordance with an embodiment, the first user 112 and the second user 114 may be simultaneously viewing the first video content on the video-processing device 102. In such an embodiment, the emotion analyzer 208 may be configured to simultaneously monitor emotions of the first user 112 and the second user 114. In addition to the first user 112, the emotion analyzer 208 may be configured to detect a change in an emotional state of the second user 114, viewing the first video content on the video-processing device 102. In response to the detected changed emotional state of the second user 114, the video processor 202 may further associate one or more other groups of image frames of the first video content, viewed during the detected change in the emotional state of the second user 114 with the changed emotional state of the second user 114. The video processor 202 may be configured to simultaneously generate the second video content and another video based on the detected changed emotional state of the first user 112 along with the second user 114. Alternatively stated, the emotion analyzer 208 may be configured to simultaneously monitor emotions of a plurality of users, such as the first user 112 and the second user 114. Accordingly, a plurality of different emotional highlights may be automatically generated while the plurality of users are viewing the first video content, such as a television (TV) program. The plurality of different emotional video highlights may correspond to the different video, where each video comprise a plurality of groups of image frames associated with a particular detected emotional state of each user of the plurality of users. For example, three users, John, Jack, and Jim may be viewing a TV program. The moments in which John became excited and sad during viewing of the TV program may be detected by the emotional analyzer 208. Consequently, two emotional video highlights, a sad video highlight and an excited video highlight may be generated. The sad video highlight may include all the groups of image frames tagged with detected sad emotional state of John. The excited video highlight include all the groups of image frames tagged with detected excited emotional state of John. Other image frames of the TV program may be filtered and excluded from the generated emotional video highlights. Similarly, Jack and Jim may be become excited and/or sad at certain moments at the time of viewing the TV program. The change of emotional states may vary for each individual, and one user may not become excited while viewing a particular scene of a video content while the other user may become excited viewing the same scene. Thus, similar to the two emotional video highlights generated based on the emotional state transition detection for John, different emotional video highlights may be generated for Jack and Jim.

In accordance with an embodiment, the plurality of different emotional highlights may be generated concurrently while the plurality of users are viewing the first video content, such as the television TV program. The plurality of different emotional highlights may be simultaneously played back on the TV while the main TV program is displayed. The playback of the plurality of different emotional highlights may occur by various display mechanism, such as picture-in-picture windows for all users at one portion of the TV display screen, while the main TV program is played on the other portion of the TV screen. In such a case, the video-processing device 102 may be a TV itself or integrated with a TV. In accordance with an embodiment, it may be desirable to generate a combined emotional video highlight of the plurality of users for a particular emotion, such as excited emotional state of John, Jack, and Jim. Accordingly, the video processor 202 may generate and display a single combined excited video highlight that may include all the groups of image frames tagged with detected excited emotional state of John, Jack, and Jim. In other words, all excited moments for each user may be played back on the TV. It may be understood that the sequence of display of emotional video highlights, such as the sad video highlights, followed by happy emotional highlights, and then the excited emotional highlights, may be configurable and set as desired by a user. Further, the display of only a particular emotional video highlight, such as all happy moments, of a particular user, such as John, or all of the plurality of users, such as John, Jack, and Jim, while viewing the TV program may be also be configurable by use of the application interface 118. In accordance with an embodiment, the detected emotional state of a user, the level of the detected emotional state of the user, and/or the user name or a thumbnail image of the user, may also be displayed at the time of playback of the generated emotional video highlights on the video-processing device 102, such as the TV.

In accordance with an embodiment, the playback of the generated emotional video highlights (such as the second video content), may be controlled based on a selected mode. A user, such as the first user 112, may select a particular mode from a plurality of modes by use of the application interface 118 rendered on the display screen 116 of the video-processing device 102. The plurality of modes may include a sports mode, a normal or default mode, a mood mode, or a combination mood mode. The sports mode may refer to a configuration setting related to detection of a change in transition of emotional states, where a threshold for detection of emotional state may be changed as compared to other modes, such as the normal mode or the mood mode. In the sports mode, the emotion analyzer 208 may be configured to adjust the base level of the various human physiological parameters accordingly to monitor the emotions of the first user 112. In the normal mode, all the plurality of emotional states 110 may be detected and processed by the video-processing device 102. In the event the mood mode is selected, a particular emotional state, such as the happy emotional state and its associated levels, may be monitored and detected by the video-processing device 102 to generate an exclusive emotional video highlight of that selected particular mood. The mood mode corresponds to one of the plurality of emotional states 110. The combination mood mode may be used to select two or more emotional states of the plurality of emotional states 110 to be detected and processed by the video-processing device 102.

In accordance with an embodiment, a priority list may be defined for known users, such as the plurality of users, with respect to monitoring and detection of transition of the emotional states. For example, the plurality of users may be viewing the TV. One of the plurality of users may be defined as a high priority user in the priority list. In such a case, the emotional analyzer 208 may dynamically switch the detection of a change in an emotional state of a particular user among the plurality of users, if the user is identified as a high priority user from the priority list.

In accordance with an embodiment, a user, such as the first user 112, may not be viewing a video, such as the first video content, but may be included in a video captured by an external camera or part of a live video shoot. In such a case, the emotion states and the changes in the emotional states of the user may be detected by the one or more wearable devices 120 worn by the user during the video shoot. The video processor 202 may receive the recorded video from the external camera and the information related to the changes in the emotional states of the user from the one or more wearable devices 120. The video processor 202 may be configured to associate one or more groups of image frames of the received recorded video with different changed emotional states based on the information from the one or more wearable devices 120. One or more emotional video highlights may then be generated in a similar process as described for the generation of the second video content from the first video content.

In accordance with an embodiment, a plurality of video content items may be viewed by the one or more users on the video-processing device 102 with an intent to edit the plurality of video content items based on the emotional state detection. In such an embodiment, the video processor 202 may be configured to combine one or more groups of image frames selected from each of the plurality of video content items to generate a single video content, based on the detected change in the emotional state of the one or more users, such as the first user 112.

In accordance with an embodiment, the functionalities or operations performed by the video-processing device 102, as described in FIG. 1 may performed by the video processor 202 and/or the emotion analyzer 208. Other operations performed by the video processor 202 and/or the emotion analyzer 208 may be understood from the description in the FIGS. 3 and 4.

Figure 3:
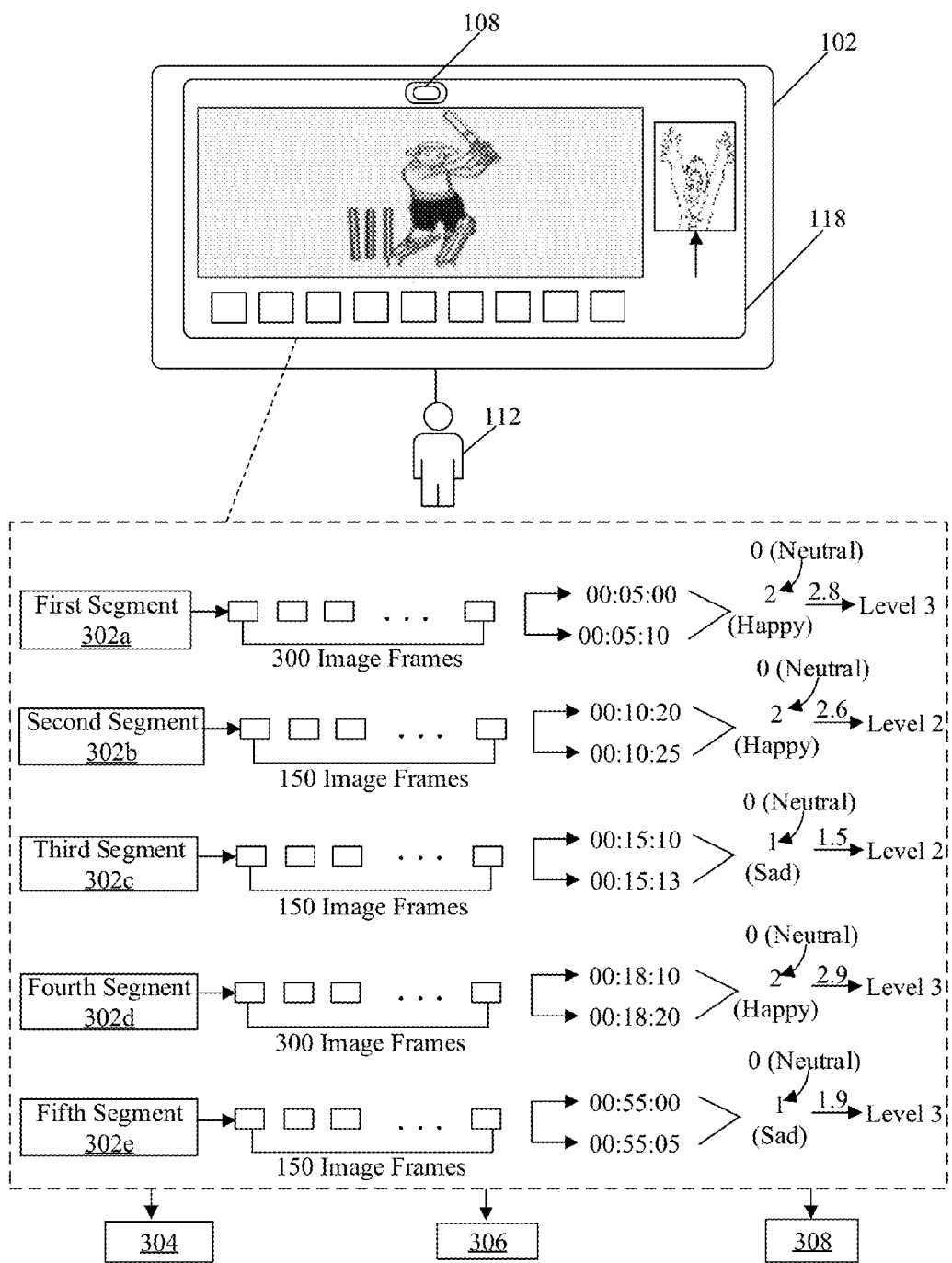
FIG. 3 illustrate an exemplary scenario for implementation of the disclosed system and method to process video content based on emotional state detection of one or more users, in accordance with an embodiment of the disclosure.

FIG. 3 illustrate an exemplary scenario for implementation of the disclosed system and method to process video based on emotional state detection, in accordance with an embodiment of the disclosure. FIG. 3 is described in conjunction with elements from the FIGS. 1 and 2. With reference to FIG. 3, there is shown a first video 302 played on the application interface 118, a plurality of segments 302a to 302e of the first video 302, and one or more video highlights 304 to 308. There is further shown the image-capturing unit 108 in-built in the video-processing device 102 (FIG. 1).

In accordance with the exemplary scenario, the first user 112 may want to edit the first video 302 while viewing the first video 302 on the video-processing device 102. The plurality of emotional states 110 may be assigned a numeric value. The neutral, sad, and happy emotional states may be assigned a numeric value of "0", "1", and "2, respectively. Each of the plurality of emotional states 110 may be further sub-classified into levels, such as 1.1, 1.2, 1.3, . . . , 1.9 may represent an extent (or a level) of sadness, where 1.1 may denote lowest level of sadness and 1.9 may denote highest level of sadness in that order. Similarly, 2.1 may denote lowest level of happiness and 2.9 may denote highest level of happiness in that order. In accordance with an embodiment, a level score of "*0.1" to "*0.4" may be grouped to "Level 1" (low level) of an emotional state. Similarly, a level score of "*0.5" to "*0.7" may be grouped to "Level 2" (moderate level) of an emotional state. And finally, a level score of "*0.8" to "*0.9" may be grouped to "Level 3" of an emotional state. For instance, a range of "2.1 to 2.4", 2.5 to 2.7", and "2.8 to 2.9" may indicate a low level, moderate level, and high level of happiness. Similarly, for other emotion categories, low, moderate and high level ranges may be defined.

In accordance with an embodiment, the emotion analyzer 208 may be configured to detect a change in an emotional state of the first user 112 viewing the first video 302 on the video-processing device 102 at playback time "00:05:05" of the first video 302. The change in the emotional state may correspond to a transition from a first emotional state, such as neutral "0", to a second emotional state, such as happy "2". The first segment 302a of the first video 302 that may start from the timestamp "00:05:00" to 00:05:10" and may include a consecutive "300" image frames, may be associated with the numeric value "2" that may represent the detected happy emotional state. Further, the emotion analyzer 208 may be configured to determine a level of "2.8" of the changed emotional state, such as the happy emotional state of the first user 112. The level "2.8" may indicate "Level 3" of happiness.

The emotion analyzer 208 may be configured to detect a second transition from the neutral "0" to the happy "2" emotional state of the first user 112 viewing the first video 302 at playback time "00:10:23" of the first video 302. Accordingly, the second segment 302b of the first video 302 that may start from the timestamp "00:10:20" to 00:10:25" and may include a consecutive "150" image frames, may be associated with the numeric value "2" that may represent the detected happy emotional state. Further, the emotion analyzer 208 may be configured to determine a level of "2.6" of the happy emotional state of the first user 112. The level "2.6" may indicate "Level 2" of happiness, such as moderately happy.

Further, at playback time "00:15:12" of the first video 302, the emotion analyzer 208 may be configured to detect a third transition from the neutral "0" to the sad "1" emotional state of the first user 112 viewing the first video 302. Accordingly, the third segment 302c of the first video 302 that may start from the timestamp "00:15:10" to 00:15:13" (3 seconds segment) and may include a consecutive "150" image frames, may be associated with the numeric value "1" that may represent the detected sad emotional state. Further, the emotion analyzer 208 may be configured to determine a level of "2.5" of the sad emotional state of the first user 112. The level "2.5" may indicate "Level 2" of sadness, such as moderately sad. Similarly, the fourth segment 302d of the first video 302 that may start from the timestamp "00:18:10" to 00:18:20" (10 seconds segment) and may include a consecutive "300" image frames, may be associated with the numeric value "2" that may represent the detected happy emotional state. A level of "2.9" that may indicate "Level 3" of happiness, such as very happy, may be determined. Lastly, the fifth segment 302e of the first video 302 that may start from the timestamp "00:55:00" to 00:55:05" (5 seconds segment) and may include a consecutive "150" image frames, may be associated with the numeric value "1" that may represent the detected sad emotional state. A level of "2.9" that may indicate "Level 3" of sadness, such as very sad, may be determined and assigned to the image frames of the fifth segment 302e.

Based on the detected changes in the emotional states of the first user 112, the video processor 202 may be configured to select the first segment 302a, the second segment 302b, and the fourth segment 302d to generate the first video highlights 304. The first video highlights 304 may be the happy emotional highlights irrespective of the determined level. Alternatively, based on the detected changes in the emotional states of the first user 112 and the determined level, the video processor 202 may be configured to select the first segment 302a and the fourth segment 302d to generate the second video highlights 306. The second video highlights 306 may include the "Level 3" emotional highlights of the happy emotional state automatically edited from the first video 302.

In accordance with an embodiment, the video processor 202 may be configured to select the third segment 302c and the fifth segment 302e to generate the third video highlights 308. The third video highlights 308 may be the sad emotional highlights dynamically edited from the first video 302. Thus, based on human emotions detection, the first video 302 may be automatically edited in quick, qualitative, and efficient manner ready for consumer use.

Figure 4A:
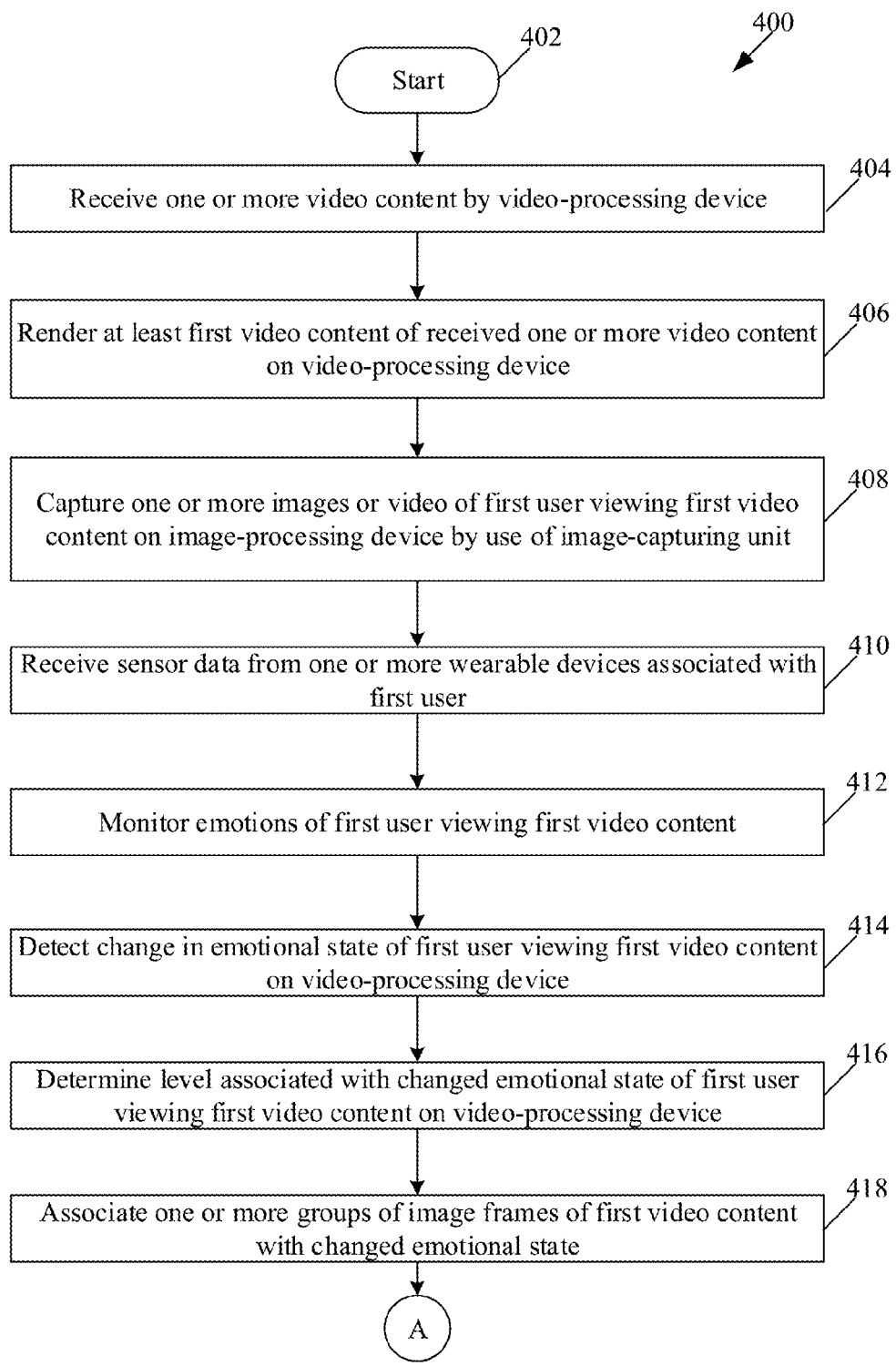
FIGS. 4A and 4B, collectively, illustrates a flow chart for implementation of an exemplary method to process video content based on emotional state detection of one or more users, in accordance with an embodiment of the disclosure.
Figure 4B:
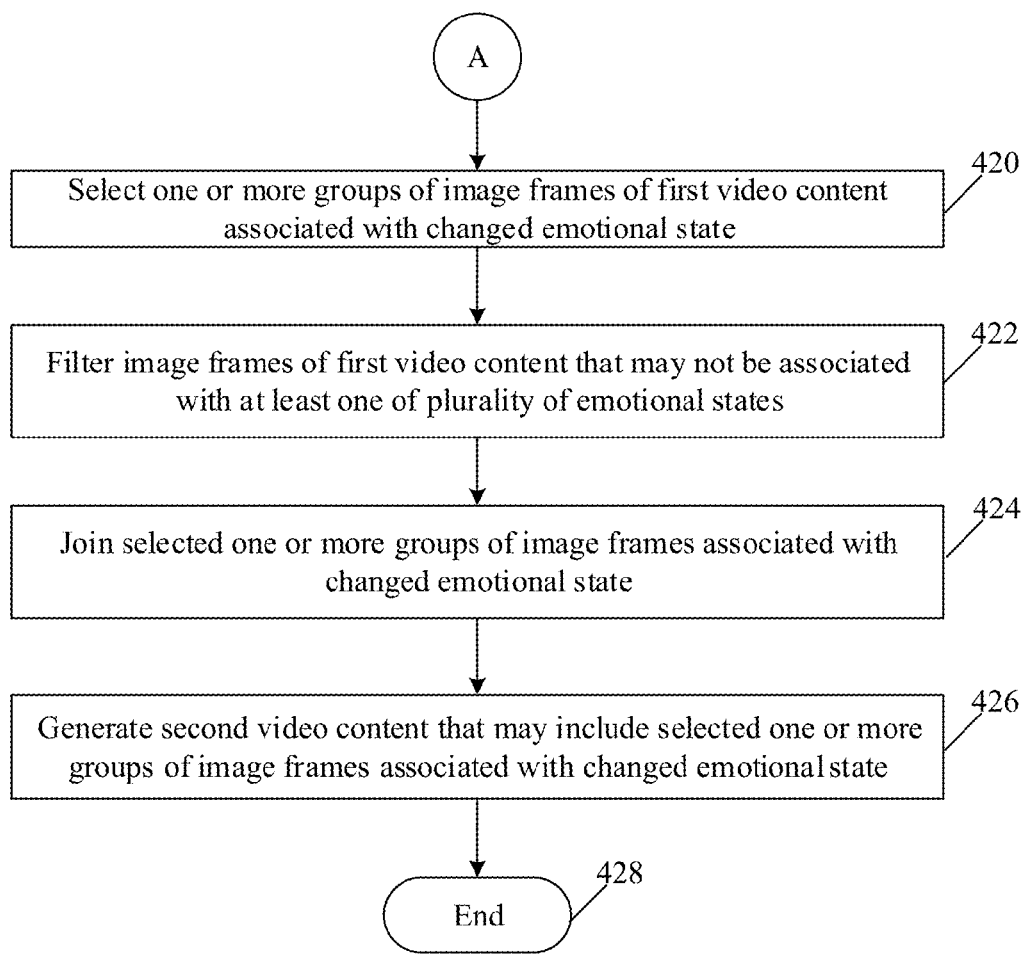

FIGS. 4A and 4B, collectively, illustrates a flow chart for implementation of an exemplary method to process video based on emotional state detection, in accordance with an embodiment of the disclosure. With reference to FIGS. 4A and 4B, there is shown a flow chart 400. The flow chart 400 is described in conjunction with elements from the FIGS. 1, 2, and 3. The method, in accordance with the flow chart 400, may be implemented in the video-processing device 102. The method starts at step 402 and proceeds to step 404.

At step 404, one or more video content may be received by the video-processing device 102. The one or more video content may be received from the server 104, via the communication network 106. In accordance with an embodiment, the one or more video content may be received from an external device, such as an external storage device, via wired or wireless communication medium. At step 406, at least a first video content of the received one or more video content, may be rendered at the video-processing device 102. The first video content may be rendered via the application interface 118. In accordance with an embodiment, the first video may be rendered based on an input received from a user, such as the first user 112. Alternatively, the video-processing device 102 may comprise one or more pre-configured settings to process the one or more video content, in user-defined order.

At step 408, one or more images or a video of the first user 112 that may be viewing the first video content on the video-processing device 102, may be captured by use of the image-capturing unit 108. At step 410, sensor data from one or more wearable devices 120 associated with the first user 112 may be received by the video-processing device 102.

At step 412, emotions of the first user 112 viewing the first video content may be continuously monitored by the video-processing device 102. The emotions may be monitored based on an analysis of the captured one or more images or the video of the first user 112 and/or the received sensor data.

At step 414, a change in an emotional state of the first user 112 viewing the first video content on the video-processing device 102, may be detected. The change in the emotional state may correspond to a transition from a first emotional state, such as neutral, to a second emotional state, such as happy, of the plurality of the emotional states 110 of the first user 112.

At step 416, a level associated with the changed emotional state of the first user 112 during viewing of the first video content on the video-processing device 102, may be determined. The determined level may correspond to an extent of the detected changed emotional state. At step 418, one or more groups of image frames of the first video content may be associated with the changed emotional state, such as happy emotional state. The association may occur during the detected change (or transition) in the emotional state of the first user 112 at one or more time instances when the first video content is viewed on the video-processing device 102.

At step 420, the one or more groups of image frames of the first video content associated with the changed emotional state, such as the second emotional state, may be selected. An example of selection of the one or more groups of image frames is shown in FIG. 3. At step 422, the image frames of the first video content that may not be associated with at least one of the plurality of emotional states 110, may be filtered. The image frames associated with the neutral emotional state may also be filtered out.

At step 424, the selected one or more groups of the image frames associated with the changed emotional state may be joined. The selected one or more groups of the image frames may be joined in pre-determined order in accordance with playback time of the selected one or more groups of the image frames. At step 426, a second video content that may include the selected one or more groups of the image frames associated with the changed emotional state may be generated. The generated second video content may correspond to emotional highlights, such as the happy or sad emotional highlights, dynamically generated from the first video content based on the detected change in the emotional states of the first user 112. The control may pass to end step 428. Alternatively, in accordance with an embodiment, a plurality of video content items may be simultaneously generated from the first video content based on a detection of a plurality of different emotional states of the first user 112.

In accordance with an embodiment of the disclosure, a system to process video content based on emotional state detection is disclosed. The system (such as the video-processing device 102 (FIG. 1) may comprise one or more circuits (hereinafter referred to as the video processor 202 and/or the emotion analyzer 208 (FIG. 2)). The emotion analyzer 208 may be configured to detect a change in an emotional state of the first user 112 viewing a first video content on the video-processing device 102. The video processor 202 may be configured to associate one or more groups of image frames of the first video content, viewed during the detected change in the emotional state of the first user 112 at one or more time instances, with the changed emotional state. The video processor 202 may be further configured to generate a second video content by use of the associated one or more groups of image frames of the first video content, based on the detected change in the emotional state of the first user.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to process video content based on emotional state detection. The set of instructions in the video-processing device 102 may cause the machine and/or computer to perform the steps that include detection of a change in an emotional state of the first user 112 viewing a first video content on the video-processing device 102. One or more groups of image frames of the first video content, viewed during the detected change in the emotional state of the first user 112 at one or more time instances, may be associated with the changed emotional state. A second video content may be generated by use of the associated one or more groups of image frames of the first video content, based on the detected change in the emotional state of the first user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system, is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A system, comprising:
   at least one circuit in a video-processing device configured to:
   select a first user of a plurality of users for detection of change in emotional state during display of first video content, wherein said selection is based on identification of said first user as a high priority user among said plurality of users;
   detect a first change in said emotional state of said first user, from a first emotional state to a second emotional state, based on said first video content displayed to said first user on said video-processing device within a time period;
   associate a first group of image frames of said first video content, displayed within said time period, with said second emotional state; and
   generate second video content, that corresponds to said associated first group of image frames of said first video content, based on said detected first change from said first emotional state to said second emotional state of said first user, wherein
   said second video content is generated based on user selection of one mode of a plurality of modes for said detection of said first change in said emotional state,
   each mode of said plurality of modes is associated with at least one specific emotional state as said second emotional state,
   a level of said second emotional state and a thumbnail image of the first user are displayed concurrently with playback of said second video content, and
   said second video content is concurrently played back while said first video content is displayed.

2. The system according to claim 1, wherein said emotional state corresponds to at least one of neutral, happy, sad, anger, contempt, fear, surprise, confused, or tender.

3. The system according to claim 1, wherein said at least one circuit is further configured to determine the level associated with said second emotional state of said first user within said time period.

4. The system according to claim 1, wherein
   said at least one circuit is further configured to monitor said emotional state of said first user based on at least one of an image of said first user, a video of said first user, or sensor data received from at least one wearable device associated with said first user, and
   said image of said first user and said video of said first user are captured by an image capturing device that is communicatively coupled to said video-processing device.

5. The system according to claim 1, wherein said at least one circuit is further configured to select said first group of image frames of said first video content associated with said second emotional state of said first user for said generation of said second video content.

6. The system according to claim 1, wherein said at least one circuit is further configured to concurrently generate a plurality of video content items from said first video content based on a detection of a plurality of different emotional states of said first user.

7. The system according to claim 1, wherein
   said at least one circuit is further configured to detect a second change in an emotional state of a second user of said plurality of users, from a third emotional state to a fourth emotional state within said time period, based on said first video content displayed to said second user on said video-processing device, and
   said second change in said emotional state of said second user is detected concurrently with said detection of said first change in said emotional state of said first user.

8. The system according to claim 7, wherein said at least one circuit is further configured to associate a second group of image frames of said first video content, displayed in said time period, with said fourth emotional state of said second user.

9. The system according to claim 8, wherein
   said at least one circuit is further configured to concurrently generate said second video content and third video content based on said detected first change in said emotional state of said first user and said detected second change in said emotional state of said second user, said third video content is generated based on said associated second group of image frames of said first video content.

10. The system according to claim 1, wherein said at least one circuit is further configured to automatically edit said first video content based on said detected first change in said emotional state of said first user.

11. The system according to claim 1, wherein said generated second video content corresponds to emotional video highlights automatically generated from said first video content based on said detected first change in said emotional state of said first user.

12. The system according to claim 1, wherein said at least one circuit is further configured to:
   combine a second group of image frames selected from each of a plurality of video content items displayed on said video-processing device; and
   generate third video content that corresponds to said combined second group of image frames based on said detected first change in said emotional state of said first user.

13. The system according to claim 1, wherein each of said plurality of modes is further associated with one of:
   a different emotional state, or
   a different threshold value for said detection of said change in said emotional state.

14. The system according to claim 1, wherein said plurality of modes include at least one of sports mode, a default mode, a mood mode, or a combination mode.

15. The system according to claim 3, wherein said at least one circuit is further configured to classify said determined level into at least one of a low level, a moderate level, or a high level.

16. A method, comprising:
   selecting, by at least one circuit in a video-processing device, a first user of a plurality of users for detection of change in emotional state during display of first video content, wherein said selection is based on identification of said first user as a high priority user among said plurality of users;
   detecting, by said at least one circuit, said change in said emotional state of said first user, from a first emotional state to a second emotional state, based on said first video content displayed to said first user on said video-processing device within a time period;
   associating, by said at least one circuit, a first group of image frames of said first video content displayed within said time period, with said second emotional state; and
   generating, by said at least one circuit, second video content that corresponds to said associated first group of image frames of said first video content, based on said detected change from said first emotional state to said second emotional state of said first user, wherein
   said second video content is generated based on user selection of one mode of a plurality of modes for said detection of said change in said emotional state,
   each mode of said plurality of modes is associated with at least one specific emotional state as said second emotional state,
   a level of said second emotional state and a thumbnail image of the first user are displayed concurrently with playback of said second video content, and
   said second video content is concurrently played back while said first video content is displayed.

17. The method according to claim 16, wherein said emotional state corresponds to at least one of neutral, happy, sad, anger, contempt, fear, surprise, confused, or tender.

18. The method according to claim 16, further comprising determining, by said at least one circuit, the level associated with said second emotional state of said first user within said time period.

19. The method according to claim 16, further comprising monitoring, by said at least one circuit, said emotional state of said first user based on at least one of an image of said first user, a video of said first user, or sensor data received from at least one wearable device associated with said first user,
   wherein said image of said first user and said video of said first user are captured by an image capturing device that is communicatively coupled to said video-processing device.

20. The method according to claim 16, further comprising selecting, by said at least one circuit, said first group of image frames of said first video content associated with said second emotional state of said first user for said generation of said second video content.

21. The method according to claim 16, further comprising automatically editing, by said at least one circuit, said first video content based on said detected change in said emotional state of said first user and said association.

22. The method according to claim 16, wherein said generated second video content corresponds to emotional video highlights automatically generated from said first video content based on said detected change in said emotional state of said first user.

23. The method according to claim 16, further comprising concurrently generating, by said at least one circuit, a plurality of video content items from said first video content based on a detection of a plurality of different emotional states of said first user.

24. A non-transitory computer-readable medium having stored thereon, computer-executable instructions, which when executed by a processor of a video-processing device, cause said processor to execute operations, said operation comprising:
   selecting a first user of a plurality of users for detection of change in emotional state during display of first video content, wherein said selection is based on identification of said first user as a high priority user among said plurality of users;
   detecting said change in said emotional state of said first user, from a first emotional state to a second emotional state, based on said first video content displayed to said first user on said video-processing device within a time period;
   associating a first group of image frames of said first video content, displayed within said time period, with said second emotional state; and
   generating second video content, that corresponds to said associated first group of image frames of said first video content, based on said detected change from said first emotional state to said second emotional state of said first user, wherein
   said second video content is generated based on user selection of one mode of a plurality of modes for said detection of said change in said emotional state,
   each mode of said plurality of modes is associated with at least one specific emotional state as said second emotional state,
   a level of said second emotional state and a thumbnail image of the first user are displayed concurrently with playback of said second video content, and said second video content is concurrently played back while said first video content is displayed.

* * * * *